United States Patent
Crane et al.

(10) Patent No.: US 6,851,120 B2
(45) Date of Patent: Feb. 1, 2005

(54) MICRO-ACTUATOR STRUCTURE FOR IMPROVED STABILITY

(75) Inventors: Peter Crane, Richfield, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 225 days.

(21) Appl. No.: 09/808,843

(22) Filed: Mar. 15, 2001

(65) Prior Publication Data
US 2002/0018322 A1 Feb. 14, 2002

Related U.S. Application Data
(60) Provisional application No. 60/218,279, filed on Jul. 13, 2000.

(51) Int. Cl.[7] ................................................. G11B 7/08
(52) U.S. Cl. ..................................... 720/674; 360/294.4
(58) Field of Search ....................... 720/674; 360/294.5, 360/294.3, 294.4, 244.4, 245.3, 264.5, 266.2, 291.9, 245.2, 294.6, 292; 310/309, 321; 361/281; 318/560; 369/222

(56) References Cited

U.S. PATENT DOCUMENTS

| | | | |
|---|---|---|---|
| 3,924,268 A | 12/1975 | McIntosh et al. | 360/78.05 |
| 4,374,402 A | 2/1983 | Blessom et al. | 360/266.2 |
| 4,651,242 A | 3/1987 | Hirano et al. | 360/245.3 |
| 4,764,829 A | 8/1988 | Makino | 360/294 |
| 4,914,725 A | 4/1990 | Belser et al. | 318/560 |
| 5,021,906 A | 6/1991 | Chang et al. | 360/235.1 |
| 5,034,828 A | 7/1991 | Ananth et al. | 360/75 |
| 5,036,419 A * | 7/1991 | Okauchi et al. | 360/291.9 |
| 5,177,652 A | 1/1993 | Yamaguchi et al. | 360/78.05 |
| 5,189,578 A | 2/1993 | Mori et al. | 360/246.6 |
| 5,303,105 A | 4/1994 | Jorgenson | 360/294.3 |
| 5,364,742 A | 11/1994 | Fan et al. | 430/317 |
| 5,375,033 A | 12/1994 | MacDonald | 361/281 |
| 5,521,778 A | 5/1996 | Boutaghou et al. | 360/264.5 |
| 5,657,188 A | 8/1997 | Jurgenson et al. | 360/294.3 |
| 5,745,319 A | 4/1998 | Takekado et al. | 360/78.05 |

(List continued on next page.)

FOREIGN PATENT DOCUMENTS

| | | |
|---|---|---|
| EP | 0 412 221 B1 | 11/1989 |
| JP | 63-122069 | 5/1988 |
| JP | 02-263369 | 4/1989 |
| JP | 04-134681 | 5/1992 |
| JP | 04-368676 | 12/1992 |
| JP | 05-094682 | 4/1993 |
| JP | 06-020412 | 1/1994 |
| JP | 07-085621 | 3/1995 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

(List continued on next page.)

*Primary Examiner*—Tianjie Chen
(74) *Attorney, Agent, or Firm*—Kinney & Lange, P.A.

(57) ABSTRACT

A disc drive having a recording disc rotatable about an axis, a slider supporting a transducing head for transducing data with the disc, and a dual-stage actuation assembly supporting the slider to position the transducing head adjacent a select radial track of the disc. The dual-stage actuation assembly includes a movable actuator arm, a suspension assembly supported by the actuator arm including the flexure, a slider bonding pad supporting the slider and a microactuator. The microactuator includes a rotor attached to the slider bonding pad and a stator attached to the flexure. A beam structure operatively connects the rotor to the stator so as to permit movement of the rotor with respect to the stator. The beam structure includes a first beam pair element and a second beam pair element.

22 Claims, 5 Drawing Sheets

U.S. PATENT DOCUMENTS

| | | | | |
|---|---|---|---|---|
| 5,764,444 | A | 6/1998 | Imamura et al. | 360/294.4 |
| 5,781,381 | A | 7/1998 | Koganezawa et al. | 360/294.3 |
| 5,796,558 | A | 8/1998 | Hanrahan et al. | 360/294.2 |
| 5,801,472 | A | 9/1998 | Wada et al. | 310/309 |
| 5,805,375 | A | 9/1998 | Fan et al. | 360/78.12 |
| 5,856,896 | A | 1/1999 | Berg et al. | 360/245.3 |
| 5,867,347 | A | 2/1999 | Knight et al. | 360/294.5 |
| 5,896,246 | A | 4/1999 | Budde et al. | 360/244.4 |
| 5,898,541 | A | 4/1999 | Boutaghou | 360/294.4 |
| 5,898,544 | A | 4/1999 | Krinke et al. | 360/264.5 |
| 5,920,441 | A | 7/1999 | Cunningham et al. | 360/78.05 |
| 5,936,805 | A | 8/1999 | Imaino | 360/294.5 |
| 5,959,808 | A | 9/1999 | Fan et al. | 360/294.3 |
| 6,246,552 | B1 * | 6/2001 | Soeno et al. | 360/294.4 |
| 6,297,936 | B1 * | 10/2001 | Kant et al. | 360/294.4 |
| 6,396,667 | B1 * | 5/2002 | Zhang et al. | 360/294.3 |
| 6,465,934 | B1 * | 10/2002 | Takeuchi et al. | 310/321 |
| 6,466,412 | B1 * | 10/2002 | Adams et al. | 360/245.2 |
| 6,512,659 | B1 * | 1/2003 | Hawwa et al. | 360/294.6 |

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub–micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advanced Information Storage Systems*, vol. 5, pp 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

"Keeping Heads on Track with Dual–Stage Actuators" by Stevens & DeLellis, *Data Storage*, vol. 7, No. 6 pp 39–44 Jun. 2000.

\* cited by examiner

MICRO-ACTUATOR STRUCTURE FOR IMPROVED STABILITY

CROSS-REFERENCE TO RELATED APPLICATION(S)

This application claims priority from Provisional Application No. 60/218,279, filed Jul. 13, 2000 for "Micro-Actuator Structure With Rotary Access Mode" by Peter Crane and Zine-Eddine Boutaghou.

BACKGROUND OF THE INVENTION

The present invention relates to a disc drive microactuator system and more particularly to an improved structure for increased stability of the microactuator rotor.

The density of concentric data tracks on magnetic discs continues to increase (that is, the width of data tracks and radial spacing between data tracks are decreasing), requiring more precise radial positioning of the transducing head. Conventionally, head positioning is accomplished by operating an actuator arm with a large-scale actuation motor, such as a voice coil motor, to radially position a slider (which carries the head) on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One particular design for high resolution head positioning involves employing a high resolution microactuator in addition to the conventional lower resolution actuator motor, thereby effecting head positioning through dual stage actuation. Various microactuator designs have been considered to accomplish high resolution head positioning. In particular, magnetic microactuator designs featuring a magnet/keeper assembly and coil have been developed. Magnetic microactuators typically include a stator portion and a rotor portion, the stator being attached to the flexure and the rotor supporting the slider. The rotor is movable with respect to the stator such that the slider can be positioned more precisely over a track of a disc.

Some existing magnetic microactuators use flexible beam springs in a "wagon wheel" design located on top of the slider to support the rotor. The beam springs have a limited thickness, generally 20 to 30 microns, with their thickness being constrained by the total microactuator thickness. Thin beam springs are highly stressed by normal disc drive loads, such as head slap deceleration. During head slap deceleration, a load in a disc drive causes the suspension, microactuator and slider to lift off the disc momentarily and then crash back into the disc surface with a very high deceleration, sometimes approaching 600 gravities (g). Under 600 g, the flexible beam springs bear a weight of 0.1 Newton (N). The force applied during head slap deceleration induces high stress in the flexible beam springs.

Prior art designs utilizing a linear accessing motion suffer from uncontrolled rotor shifting caused during hard seek acceleration of the voice coil motor (VCM). The large shift in rotor position stresses the beam springs to approximately 8.8% of their breaking strength and because of the time-varying nature of the VCM acceleration induces fatigue failure. There is a need in the art for an improved microactuator beam structure to increase the rotor stability.

BRIEF SUMMARY OF THE INVENTION

The present invention is a disc drive having a recording disc rotatable about an axis, a slider supporting a transducing head for transducing data with the disc, and a dual-stage actuator assembly supporting the slider to position the transducing head adjacent a selected radial track of the disc. The dual-stage actuation assembly includes a movable actuator arm, a suspension assembly supported by the actuator arm and including a flexure, a slider bonding pad supporting the slider and a microactuator. The microactuator includes a rotor attached to the slider bonding pad and a stator attached to the flexure. A beam structure operatively connects the rotor to the stator so as to permit movement of the rotor with respect to the stator. The beam structure includes a first beam pair element aligned with the width of rotor and a second beam pair element aligned with the length and the width of the rotor.

DETAILED DESCRIPTION

Figure 1:
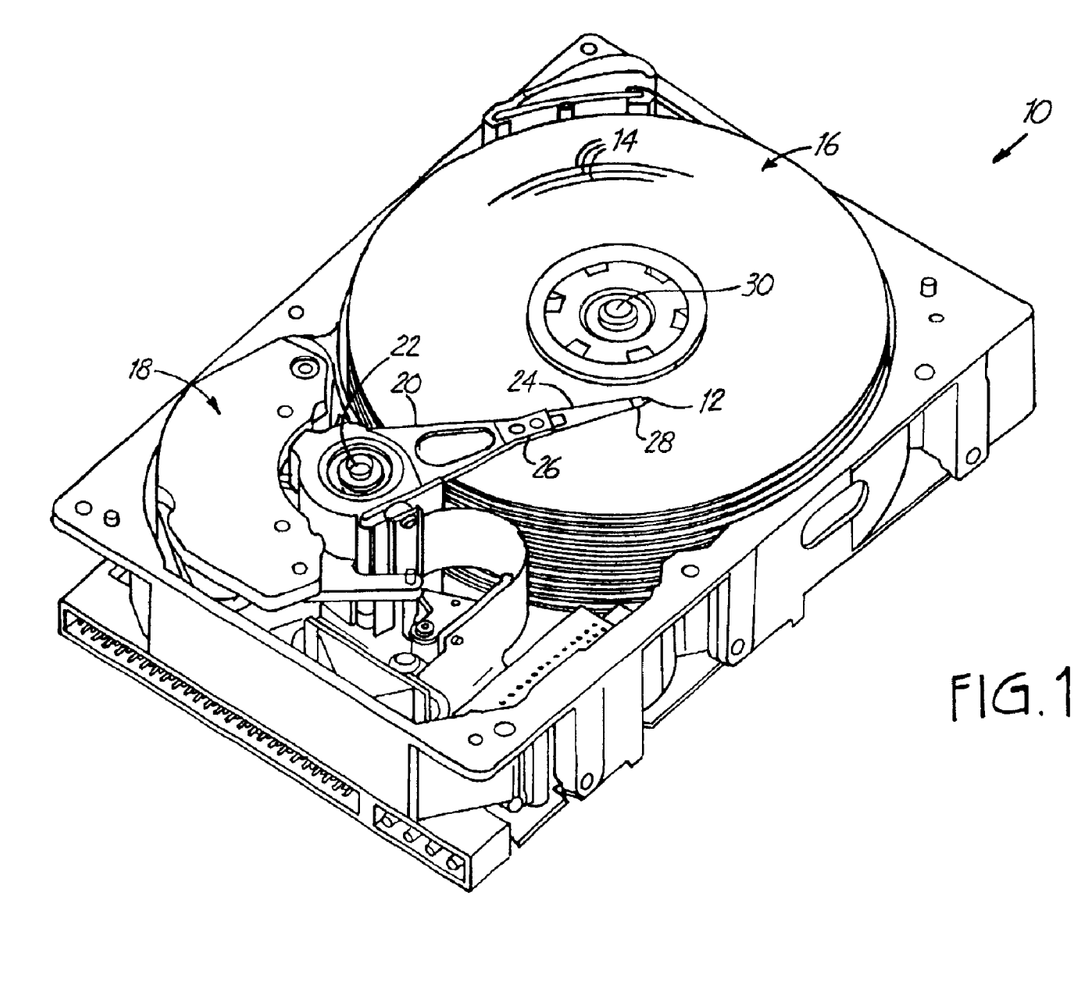
FIG. 1 is a perspective view of a conventional disc actuation system for positioning a slider over a track of a disc.

FIG. 1 is a perspective view of a disc drive actuation system 10 for positioning a slider 12 over a track 14 of a disc 16. Actuation system 10 includes a voice coil motor (VCM) 18 arranged to rotate an actuator arm 20 on a spindle around an axis 22. A head suspension 24 is connected to actuator arm 20 at a head mounting block 26. A flexure 28 is connected to an end of head suspension 24, and carries slider 12. Slider 12 carries a transducing head (not shown in FIG. 1) for reading and/or writing data on concentric tracks 14 of disc 16. Disc 16 rotates around an axis 30, so that windage is encountered by slider 12 to keep it aloft a small distance above the surface of disc 16.

VCM 18 is selectively operated to move actuator arm 20 about axis 22, thereby moving slider 12 between tracks 14 of disc 16. However, for disc drive systems with high track density, VCM 18 lacks significant resolution and frequency response to position a transducing head on slider 12 precisely over a selected track 14 of disc 16. Therefore, a higher resolution actuation device is necessary.

Figure 2:
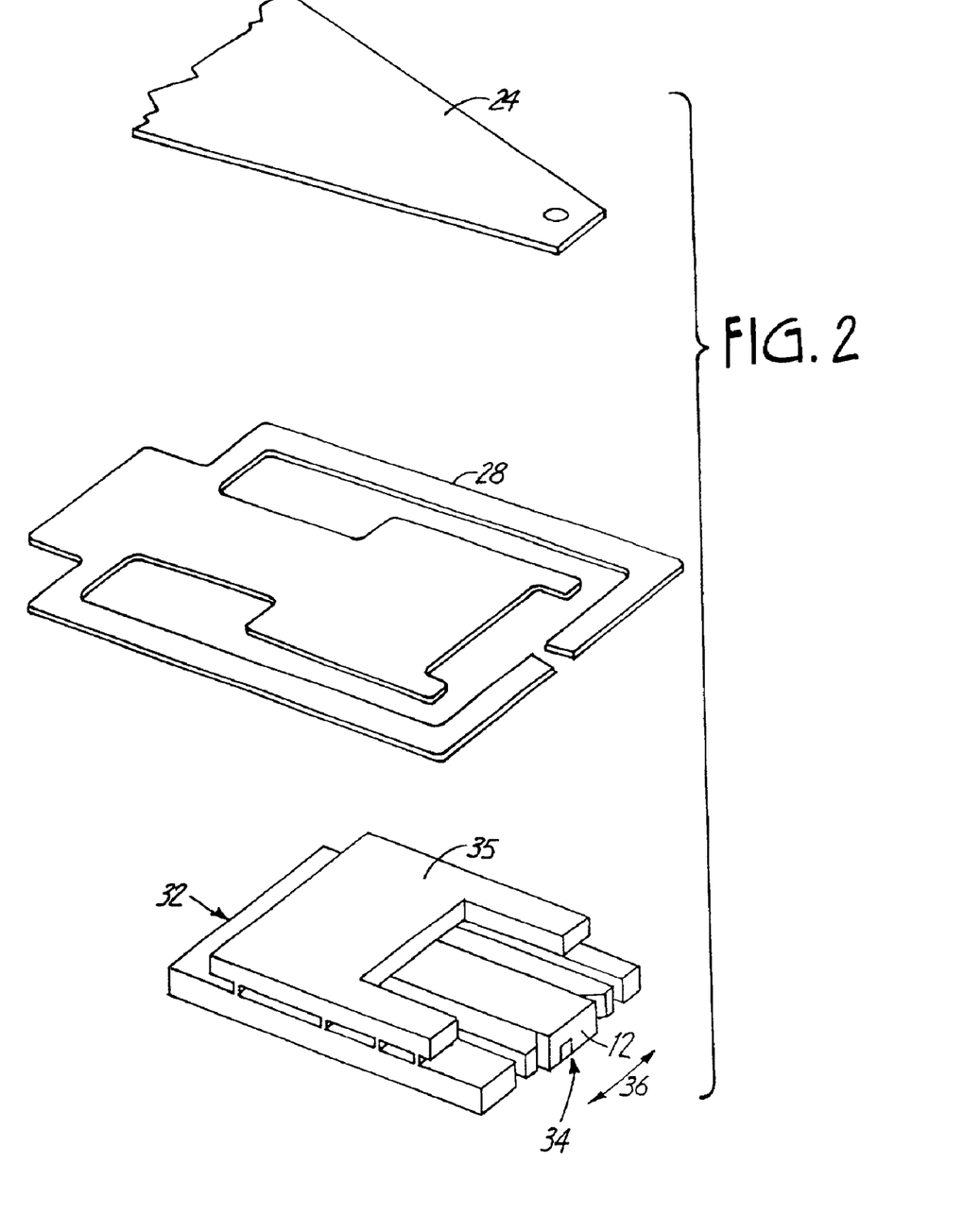
FIG. 2 is an exploded perspective view of a portion of a disc drive including a microactuator according to the present invention.

FIG. 2 is an exploded perspective view of a portion of a disc drive including a microactuator 32 for high resolution head positioning. Flexure 28 is attached to head suspension 24 and microactuator 32 is attached to flexure 28. Microactuator 32 carries slider 12 above a surface of disc 16. A transducing head 34 is carried by slider 12 to write and read data to and from the disc. In operation, head suspension 24, flexure 28, and microactuator 32 carrying slider 12 are all moved together as coarse positioning is performed by VCM 18 (FIG. 1) as it moves actuator arm 20 (FIG. 1). To achieve fine positioning of transducing head 34, a magnetic circuit generates a force which causes bending of beam springs associated with microactuator 32. The magnetic circuit is formed between a keeper and coil component 35 bonded to the top of microactuator 32 with a magnet (shown in FIG. 3) carried by microactuator 32. As a result, the portion of microactuator 32 carrying slider 12 moves slightly with respect to flexure 28 in the direction of arrows 36, displacing transducing head 34 with high resolution for precise positioning of transducing head 34 over a selected track of the disc. The horizontal plane of microactuator 32 lies parallel to the surface of disc 16.

Figure 3:
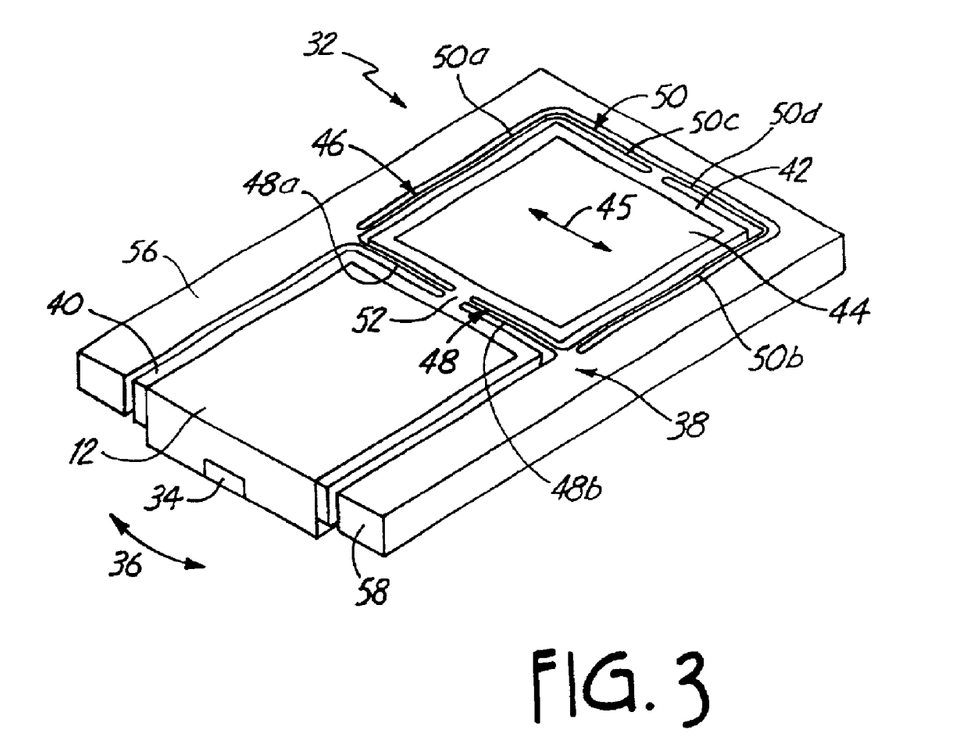
FIG. 3 is a top perspective view of the microactuator with a slider and a rotor in a neutral position.

FIG. 3 is a top perspective view of microactuator 32 for attachment to flexure 28. Microactuator 32 comprises a stator 38, slider bonding pad 40 attached to slider 12, magnet bonding pad 42 and magnet 44. Flexure 28 (FIG. 2) is attached to microactuator 32 at stator 38. Slider bonding pad 40, magnet bonding pad 42 and magnet 44 comprise the rotor of microactuator 32. A magnetic circuit (not shown) actuates microactuator 32 and moves the magnet 44 in the direction of arrows 45, causing slider 12 to move in the direction of arrows 36 with respect to stator 38, finely positioning the transducing head 34 carried by slider 12 over a track of a disc. The width dimension of the rotor is substantially parallel to the direction of arrows 36 (the direction of the rotor movement) and the length dimension of the rotor is substantially perpendicular to the direction of arrows 36.

Flexible beam elements operatively connect the rotor to stator 38, permitting movement of the rotor with respect to stator 38. The flexible beam elements form a beam structure 46 comprised of a first beam pair element 48 and a second beam pair element 50. First beam pair 48 has a left first beam 48a and a right first beam 48b. A rotation center 52 located at the intersection of left first beam 48a and right first beam 48b defines the center of in-plane rotation for the rotor. The rotor is balanced about rotation center 52 and perfect balance is approached by use of beam structure 46.

Figure 4:
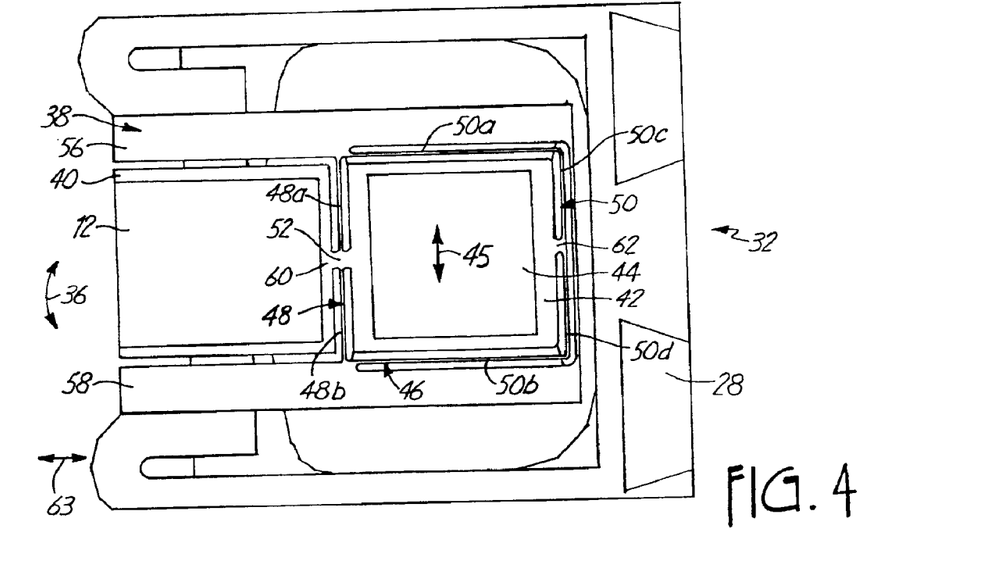
FIG. 4 is a top view of the microactuator with the slider and the rotor in a neutral position.

FIG. 4 shows a top view of microactuator 32 and beam structure 46. First beam pair 48 extends from a first stator arm 56 to a second stator arm 58 and lies between slider bonding pad 40 and magnet bonding pad 42. First beam pair 48 is substantially aligned with the width of the rotor. A distal connector 60 connects a proximal end of slider bonding pad 40 with a distal end of magnet bonding pad 42 and bisects first beam pair 48. Rotation center 52 is located at distal connector 60.

Second beam pair 50 includes a left lateral beam 50a and a right lateral beam 50b. Both left lateral beam 50a and right lateral beam 50b have a dog-leg configuration such that one length of each lateral beam 50a and 50b is aligned with the length of the rotor alongside magnet bonding pad 42 between pad 42 and stator 38. A transverse length 50c and 50d of lateral beams 50a and 50b are aligned with the width of the rotor and lie between the proximal end of magnet bonding pad 42 and stator 38. Left lateral beam 50a is attached to first stator arm 56, while right lateral beam 50b is attached to second stator arm 58. A connector 62 connects the rotor (at the proximal end of magnet bonding pad 42) to second beam pair 50 at its approximate midpoint. Transverse length 50c of left lateral beam 50a and transverse length 50d of right lateral beam 50b are connected at connector 62.

Figure 5:
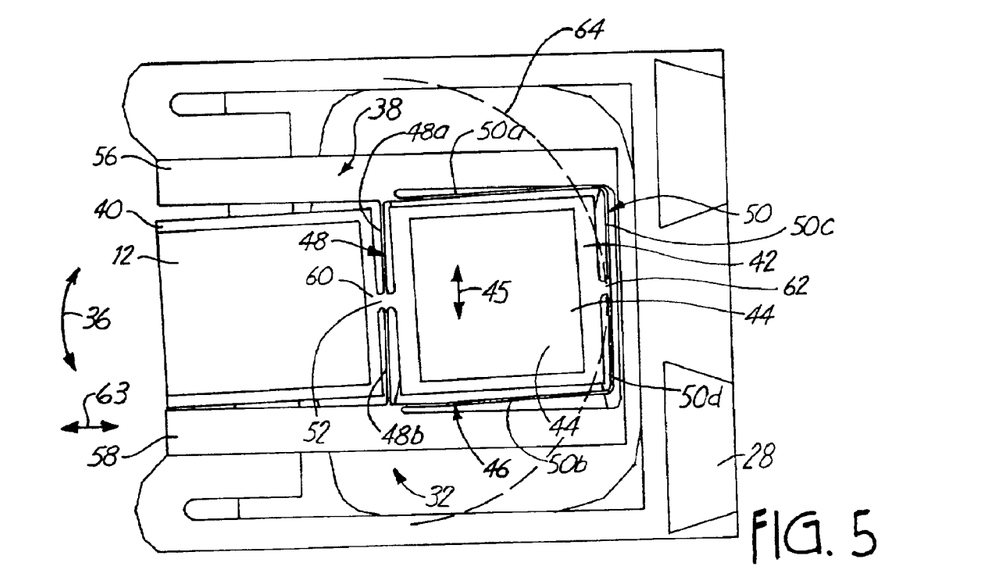
FIG. 5 is a top view of the microactuator with the slider and the rotor in movement.
Figure 6:
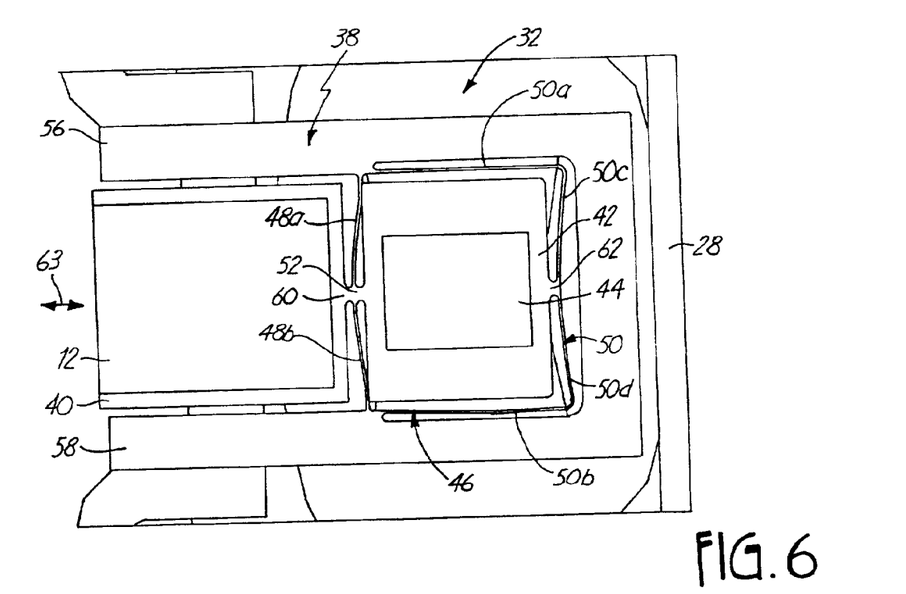
FIG. 6 is a top view of the microactuator showing beam deflection under longitudinal loading.

Left lateral beam 50a and right lateral beam 50b allow connector 62 to move transversely, in the direction of arrows 45 (as seen in FIG. 5). The transverse lengths 50c, 50d of second beam pair 50 also allow connector 62 to move laterally, in the direction of arrows 63 (as seen in FIG. 6). Therefore connector 62 can move transversely and laterally around rotation center 52 in a plane parallel to the disc surface, thus tracing an arc around rotation center 52 (as seen in FIG. 5).

FIG. 5 is a top view of microactuator 32 with the rotor in a displaced position. Upon actuation of microactuator 32, a force is generated to move magnet 44, thereby bending beam structure 46 and moving the rotor with respect to stator 38. Beam structure 46, and more particularly second beam pair 50, allows sufficient flexibility for the proximal end of the rotor (magnet bonding pad 42) to move in the direction indicated by arrows 45 when microactuator 32 is actuated and in the direction indicated by arrows 63 when the rotor is pulled away from the stator (as seen in FIG. 6). Flexibility in beam structure 46 is required for side to side movement of the rotor during actuation of microactuator 32. When the rotor finally positions slider 12 over a track of a disc it rotates side to side and slightly traces an arc 64 around rotation center 52. Prior art beam structures allowed a vertical deflection of approximately 100 microns. Beam structure 46 of the present invention prevents the rotor from significantly shifting vertically out of the horizontal plane of microactuator 32 and minimizes the amount of vertical deflection.

Head slap deceleration is a condition that occurs when a load in the disc drive causes head suspension 24, attached to flexure 28 (FIG. 2), microactuator 32 and slider 12 to momentarily lift off of disc 16 and then crash back into the disc surface with very high deceleration. The deceleration approaches 600 gravities (g), thus the weight of suspension borne by microactuator 32 is about 0.1 Newtons (N). Some existing magnetic microactuators use flexible beam springs in a "wagon wheel" design located on top of the slider to support the rotor. The beam springs have a limited thickness, generally 20 to 30 microns. The beam spring thickness is constrained by the total microactuator thickness. The limited thickness of the beam springs in the prior art increases the stress borne by those beam springs during a head slap event. Beam elements 48 and 50 of the present invention have a typical beam height of approximately 200 microns, which is enabled by packaging beam structure 46 around the sides of the rotor, thereby not increasing overall height of microactuator 32. Generally as the beam spring thickness increases, the stress in the beam decreases. Increasing the height of beam elements 48 and 50 reduces the stress in that beam under head slap loading according to the following relation:

$$S = \frac{My}{I} = \frac{6FL}{Wh^2}$$

For example, to calculate the stress in left lateral beam 50a, S equals the stress in the beam element (N/m²), M is the bending moment (N–m), y is the half height (m) of left lateral beam 50a, and I is the area moment of inertia ($m^4=wh^3/12$). F is the vertical loading under head slap deceleration (N), L is the length (m) from the beam root point (where left lateral beam 50a attaches to first stator arm 56) to loading (where head suspension 24 bears down on slider 12 during a head slap event), w is the width (m) of left lateral beam 50a, and h is the height (m) of left lateral beam 50a. Comparing the present invention having beam heights (for beam elements 48 and 50) of approximately 200 microns with the prior art microactuator having beam heights of 25 microns, the stresses in the beam elements are reduced by approximately a factor of 32.

In some prior art embodiments of the microactuator, uncontrolled shifting of the rotor occurs during hard seek accelerations of VCM 18, that is movement of the slider across a large number of tracks. A large, in-plane shift in rotor position (approximately 24.8 microns) stresses some prior art beam elements to about 8.8% of their breaking strength. Because of the time-varying acceleration of VCM 18, fatigue failure in the beam elements may be induced. In the present invention, first beam pair element 48 defines rotation center 52. The rotor is balanced about the rotation center 52. The design of beam structure 46 and near perfect balance of the rotor results in substantially less rotor shifting (approximately 0.56 microns) during acceleration of VCM 18. The stress induced in beam structure 46 is significantly less, approximately 0.6% of the breaking strength, and a safe level for fatigue stress.

FIG. 6 is a top view of microactuator 32 under stiction loading. Stiction loading occurs when water and/or a lubricant forms on the disc and the water or lubricant film attaches to a transducing head 34, forcing transducing head 34 to drag along with the disc as it rotates. During stiction loading slider 12 carrying transducing head 34 is longitudinally pulled away from the stator. The stiction load deflects beam structure 46 when the rotor is longitudinally pulled away from stator 38 in direction 63. First beam pair 48 and transverse lengths 50c, 50d of lateral beams 50a, 50b are pulled out of position and bow out towards slider 12 and slider bonding pad 40. The dragging of transducing head 34 along the disc continues until the film is broken or beam structure 46 collapses.

Figure 7:
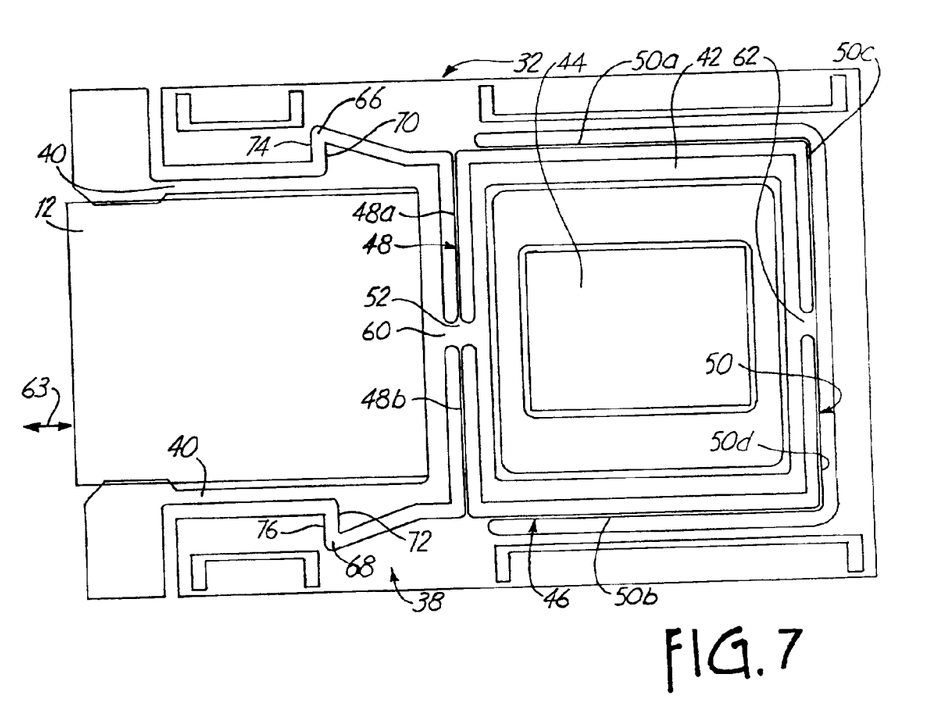
FIG. 7 is a top view of the microactuator with deflection limiters.

Beam structure 46 is preferably designed to be relatively compliant in the longitudinal direction. As illustrated by FIG. 7, the present invention includes deflection limiters 66 and 68 to constrain the deflection of beam structure 46. As the stiction load increases, beam structure 46 can not accommodate the load without risking failure and deflection limiters 66 and 68 bear part of the stiction load. Each deflection limiter 66, 68 has a proximal hook 70, 72 formed in slider bonding pad 40 and a distal stop wall 74, 76 formed in stator 38 respectively. After slider 12 is pulled away from stator 38 in direction 63 approximately 50 microns, proximal hooks 70 and 72 are engaged by distal stop walls 74 and 76, thus stopping further movement of slider 12 away from stator 38. If the deflection were not constrained by deflection limiters 66, 68 the resultant stress could cause the beam structure 46 to collapse and break, resulting in microactuator failure since replacing beam structure 46 is not practical.

Beam structure 46 operatively connects the rotor of microactuator 32 to stator 38 and prevents excessive movement and twisting of the stator out of the horizontal plane of microactuator 32. Beam structure 46 is comprised of first beam pair element 48 aligned with the width of the rotor and second beam pair element 50 in a dog-leg configuration and aligned with the length and the width of the rotor. During a head slap event, the increased thickness of beam elements 48 and 50 and the arrangement of beam structure 46 around the sides of the rotor, reduces the stress in the beam elements, prevents failure of the beam elements and keeps the rotor from significant movement out of the horizontal plane of microactuator 32. The rotor of the present invention is balanced about rotation center 52 defined by first beam pair 48. During hard seek acceleration by VCM 18, near perfect balance of the rotor about rotation center 52 results in significantly less stress induced in beam structure 46 by uncontrolled rotor shifting, thus decreasing the likelihood of fatigue stress in beam structure 46. During stiction loading of micro actuator 32, deflection limiters 64 and 66 prevent slider 12 from being completely pulled out of stator 38. The inability for the rotor of the present invention to maintain its position within the horizontal and vertical planes of micro actuator 32 is an advantage over prior art microactuators.

Although the present invention has been described with reference to preferred embodiments, workers skilled in the art will recognize that changes may be made in form and detail without departing from the spirit and scope of the invention.

What is claimed is:

1. A microactuator for finely positioning a transducing head carried by a slider adjacent a select radial track of a disc, the microactuator comprising:
   a microactuator frame having a stator and having a rotor which holds the slider and is movable with respect to the stator; and
   means for limiting deflection of the rotor out of a plane defined by the microactuator frame.

2. The microactuator of claim 1 wherein the means for limiting deflection of the rotor comprises a beam structure operatively connecting the rotor to the stator so as to permit movement of the rotor with respect to the stator, the beam structure including a first beam pair element defining a rotation center and a second beam pair element arranged to restrain the rotor from twisting out of plane.

3. The microactuator of claim 2 wherein the first beam pair element comprises two first beam elements aligned with a width of the rotor.

4. The microactuator of claim 3 wherein the second beam pair element comprises two second beam elements, one length of each second beam element being aligned with a length of the rotor and a transverse length of each second beam element being aligned the width of the rotor.

5. The microactuator of claim 1 wherein the means for limiting deflection of the rotor is operable to limit deflection of the rotor out of a plane defined by the microactuator frame to less than one micron.

6. The microactuator of claim 1, and further comprising:
   at least one deflection limiter for limiting deflection in the direction of the length of the rotor.

7. A microactuator comprising:
   a rotor attached to a slider;
   a stator; and
   a beam structure operatively connecting the rotor to the stator so as to permit movement of the rotor with respect to the stator, the beam structure and the slider being aligned in a plane defined by the microactuator, wherein the beam structure limits deflection of the rotor out of the plane defined by the microactuator, the beam structure including a first beam pair element aligned with a width of the rotor and a second beam pair element aligned with a length and the width of the rotor.

8. The microactuator of claim 7 wherein the first beam pair element comprises two first beam elements.

9. The microactuator of claim 8 wherein the two first beam elements define a rotation center, the rotation center defining a center of in-plane rotation of the rotor.

10. The microactuator of claim 9 wherein the rotor is balanced about the rotation center.

11. The microactuator of claim 7, and further comprising:
    a distal connector connecting a distal end of a magnet bonding pad and a slider bonding pad, wherein the distal connector is located at a rotation center.

12. The microactuator of claim 7 wherein the second beam pair element comprises two second beam elements in a dog-leg configuration, comprising:
    a left lateral beam wherein one length is aligned with the length of the rotor and a transverse length is aligned with the width of the rotor; and
    a right lateral beam wherein one length is aligned with the length of the rotor and a transverse length is aligned with the width of the rotor.

13. The microactuator of claim 12 wherein the second beam pair element is connected to the stator.

14. The microactuator of claim 12, and further comprising:
   a proximal connector connecting the proximal end of the rotor and the second beam pair element.

15. The microactuator of claim 14 wherein the proximal connector is attached to the left lateral beam and the right lateral beam.

16. The microactuator of claim 7 wherein the beam structure has a height of approximately 200 microns.

17. The microactuator of claim 16 wherein the rotor stresses the beam structure to less than approximately 8.8% of its breaking strength.

18. The microactuator of claim 7 wherein the microactuator includes at least one deflection limiter for limiting deflection in the direction of the length of the rotor.

19. The microactuator of claim 18 wherein each deflection limiter comprises:
   a hook formed in a slider bonding pad which supports the slider; and
   a stop wall formed in the stator such that when the slider is longitudinally pulled away from the stator the hook engages the stop wall and prevents further movement of the slider.

20. A disc drive having a recording disc rotatable about an axis, a slider supporting a transducing head for transducing data with the disc, and a dual-stage actuation assembly supporting the slider to finely position the transducing head adjacent a selected radial track of the disc, the dual-stage actuation assembly comprising:
   a movable actuator arm;
   a suspension assembly supported by the actuator arm, the suspension assembly including a flexure;
   a slider bonding pad supporting the slider; and
   a microactuator comprising:
      a rotor attached to the slider;
      a stator attached to the flexure;
      a beam structure operatively connecting the rotor to the stator so as to permit movement of the rotor with respect to the stator, the beam structure including a first beam pair element aligned with a width of the rotor and a second beam pair element aligned with a length and the width of the rotor; and
      a distal connector connecting a distal end of a magnet bonding pad and the slider bonding pad, wherein the distal connector is located at a rotation center.

21. A disc drive having a recording disc rotatable about an axis, a slider supporting a transducing head for transducing data with the disc, and a dual-stage actuation assembly supporting the slider to finely position the transducing head adjacent a selected radial track of the disc, the dual-stage actuation assembly comprising:
   a movable actuator arm;
   a suspension assembly supported by the actuator arm, the suspension assembly including a flexure;
   a slider bonding pad supporting the slider; and
   a microactuator comprising:
      a rotor attached to the slider;
      a stator attached to the flexure;
      a beam structure operatively connecting the rotor to the stator so as to permit movement of the rotor with respect to the stator, the bean-i structure including a first beam pair element aligned with a width of the rotor and a second beam pair element aligned with a length and the width of the rotor; and
      at least one deflection limiter for limiting deflection in the direction of the length of the rotor.

22. The disc drive of claim 21 wherein each deflection limiter comprises:
   a hook formed in the slider bonding pad; and
   a stop wall formed in the stator such that when the slider is longitudinally pulled away from the stator the hook engages the stop wall and prevents further movement of the slider.

* * * * *

UNITED STATES PATENT AND TRADEMARK OFFICE
CERTIFICATE OF CORRECTION

PATENT NO. : 6,851,120 B2
DATED : February 1, 2005
INVENTOR(S) : Peter Crane et al.

It is certified that error appears in the above-identified patent and that said Letters Patent is hereby corrected as shown below:

<u>Column 4,</u>
Line 16, delete "finally", insert -- finely --

<u>Column 5,</u>
Lines 64 and 67-68, delete "micro actuator", insert -- microactuator --
Line 66, delete "inability", insert -- ability --

<u>Column 8,</u>
Line 25, delete "bean-i", insert -- beam --

Signed and Sealed this

Second Day of August, 2005

JON W. DUDAS
*Director of the United States Patent and Trademark Office*